US011443735B2

(12) United States Patent
Lee (10) Patent No.: US 11,443,735 B2
(45) Date of Patent: Sep. 13, 2022

(54) METHOD FOR GENERATING FILLED PAUSE DETECTING MODEL CORRESPONDING TO NEW DOMAIN AND DEVICE THEREFOR

(71) Applicant: LG ELECTRONICS INC., Seoul (KR)

(72) Inventor: Yun Jin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 16/807,088

(22) Filed: Mar. 2, 2020

(65) Prior Publication Data

US 2021/0193118 A1 Jun. 24, 2021

(30) Foreign Application Priority Data

Dec. 18, 2019 (KR) ........................ 10-2019-0169906

(51) Int. Cl.
*G10L 15/07* (2013.01)
*G10L 15/06* (2013.01)
*G10L 19/06* (2013.01)

(52) U.S. Cl.
CPC ............ *G10L 15/063* (2013.01); *G10L 19/06* (2013.01); *G10L 15/07* (2013.01); *G10L 2015/0631* (2013.01); *G10L 2015/0635* (2013.01)

(58) Field of Classification Search
CPC ..................................................... G10L 15/07
See application file for complete search history.

(56) References Cited

U.S. PATENT DOCUMENTS 5,864,810 A * 1/1999 Digalakis ................ G10L 17/00
704/254
2011/0040554 A1* 2/2011 Audhkhasi ............. G09B 19/04
704/235

OTHER PUBLICATIONS

Tian, et al., Improving End-to-End Speech-to-Intent Classification with Reptile, arXiv:2008.01994. (Year: 1994).*
Alex Nichol and John Schulman, "Reptile: a Scalable Meta-learning Algorithm," 2018. (Year: 2018).*

* cited by examiner

*Primary Examiner* — Feng-Tzer Tzeng
(74) *Attorney, Agent, or Firm* — Lee, Hong, Degerman, Kang & Waimey PC (57) ABSTRACT

Disclosed are a method and a device for generating a filled pause detection model using a small amount of speech data included in a new domain in a 5G communication environment by executing artificial intelligence (AI) algorithms and/or machine learning algorithms provided therein. According to the present disclosure, the filled pause detection model generating method for a new domain may include constructing a filled pause detection model for the new domain, determining the initial model parameter for the filled pause detection model for the new domain by combining model parameters for filled pause detection models of a plurality of existing domains, and training the filled pause detection model of the new domain in which initial model parameter is set, using speech data from the new domain as training data.

13 Claims, 6 Drawing Sheets

| Reptile Algorithm |
|---|
| outer loop { Initialize $\theta$<br>for iteration = 1,2,... do<br>    Sample tasks $T_1, T_2, ..., T_n$<br>    inner loop { for i = 1, 2,...,n do<br>        Computer $W_i = SGD(L_{Ti}, \theta, k)$<br>    end for<br>    Update $\theta \leftarrow \theta + \beta \frac{1}{n}\sum_{i=1}^{n}(W_i - \theta)$<br>end for |

METHOD FOR GENERATING FILLED PAUSE DETECTING MODEL CORRESPONDING TO NEW DOMAIN AND DEVICE THEREFOR

CROSS-REFERENCE TO RELATED APPLICATION(S)

Pursuant to 35 U.S.C. § 119(a), this application claims the benefit of earlier filing date and right of priority to Korean Patent Application No. 10-2019-0169906, filed on Dec. 18, 2019, the contents of which are all hereby incorporated by reference herein in their entirety.

BACKGROUND

1. Technical Field

The present disclosure relates to a method and a device for generating a filled pause detection model with a small amount of speech data included in a new domain by using a Reptile algorithm among meta-learning algorithms.

2. Description of Related Art

As technology continues to advance, various services using speech recognition technology have been introduced in a number of fields in recent years. Speech recognition technology may be understood as a series of processes of understanding utterances spoken by a speaker and converting the spoken utterance to text data recognizable and usable by computers. Furthermore, speech recognition services using such speech recognition technology may include a series of processes for recognizing a user's spoken utterance and providing a service appropriate thereto.

In a device having a speech recognition function, a delay may occur while the user makes an utterance toward the device. For example, if a user hesitates because words necessary to complete the utterance momentarily do not come to mind, a filled pause may occur. In such speech recognition environment, the device having the speech recognition function is provided with a filled pause detector with a filled pause detection model, in order to efficiently perform a speech recognition processing even if the filled pause occurs.

The filled pause has different acoustic features depending on the domain in which the filled pause is generated. Therefore, when producing the filled pause detector, the domain in which the filled pause has been generated should be considered. However, large amounts of training data are not always available for each domain. When insufficient training data is used for training in existing deep learning, it may be difficult to produce a filled pause detector with good performance.

The above-described background technology is technical information that the inventors hold for deriving of the present disclosure or that the inventors acquired in the process of deriving the present disclosure. Thus, the above-described background technology may not necessarily be regarded as known technology disclosed to the general public prior to the filing of the present application.

SUMMARY OF THE INVENTION

The present disclosure is directed to addressing the issue associated with some related art in which, when insufficient training data is used for training in existing deep learning, it may be difficult to produce a filled pause detector with good performance.

The present disclosure is further directed to training a filled pause detection model with a small amount of training data included in a new domain, thereby generating a filled pause detection model with high detection performance.

The present disclosure is still further directed to training a filled pause detection model with a small amount of training data included in a domain by using a Reptile algorithm among meta-learning algorithms, thereby generating a filled pause detection model with high detection performance.

The present disclosure is still further directed to addressing, by using optimal process resources, the issue associated with the related art in which, when insufficient training data is used for training in existing deep learning, it may be difficult to generate a filled pause detector with good performance.

According to an embodiment of the present disclosure, a filled pause detection model generating method for a new domain may include determining an initial model parameter for the filled pause detection model of the new domain by combining model parameters of filled pause detection models that are trained with speech data from a plurality of existing domains.

Specifically, according to the present embodiment, a filled pause detection model generating method for a new domain may include constructing a filled pause detection model of the new domain; determining an initial model parameter for the filled pause detection model of the new domain by combining model parameters for filled pause detection models of the plurality of existing domains; and training the filled pause detection model of the new domain in which the initial model parameter is set, using speech data from the new domain as training data.

The method of training the filled pause detection model according to the present embodiment may train the filled pause detection model with a small amount of training data included in a domain by using a Reptile algorithm among meta-learning algorithms, thereby generating a filled pause detection model with high detection performance.

According to another embodiment of the present disclosure, a filled pause detection model generating device for a new domain may include a constitutor configured to construct a filled pause detection model of the new domain; a determiner configured to determine an initial model parameter for the filled pause detection model of the new domain by combining model parameters for filled pause detection models of a plurality of existing domains; and a trainer configured to train, with speech data from the new domain, the filled pause detection model of the new domain in which the initial model parameter is set.

In addition to these embodiments, another method and system for implementing the present disclosure, and a computer-readable recording medium storing a computer program for executing the method, may be further provided.

The above and other aspects, features, and advantages of the present disclosure will become apparent from the detailed description of the following aspects in conjunction with accompanying drawings.

According to the present disclosure, it is possible to train the filled pause detection model with only a small amount of training data, thereby generating a filled pause detection model with high detection performance.

In addition, it is possible to train the filled pause detection model with a small amount of training data included in a domain by using a Reptile algorithm among meta-learning algorithms, thereby generating a filled pause detection model with high detection performance.

In addition, by using optimal process resources, it is possible to address the issue of the related art in which, when insufficient training data is used for training in existing deep learning, it may be difficult to generate a filled pause detector with good performance.

The effects of the present disclosure are not limited to those mentioned above, and other effects not mentioned may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. Further, in the following description of the present disclosure, a detailed description of known technologies incorporated herein will be omitted when it may make the subject matter of the present disclosure rather unclear.

The terminology used herein is used for the purpose of describing particular embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

Figure 1:
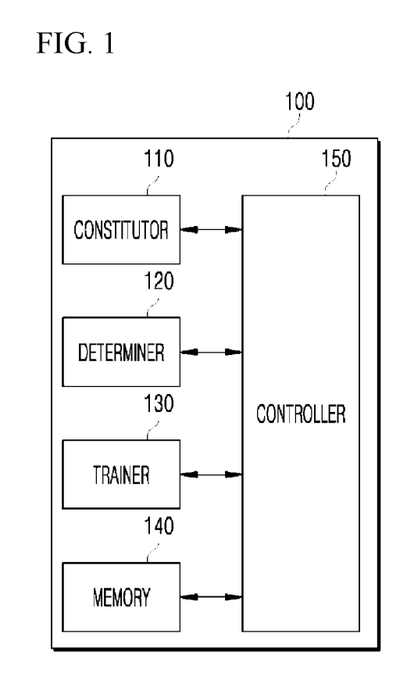
FIG. 1 is a schematic block diagram of a filled pause detection model generating device for a new domain according to an embodiment of the present disclosure.

FIG. 1 is a schematic block diagram of a model training device configured to train a filled pause detection model according to an embodiment of the present disclosure. Referring to FIG. 1, a filled pause detection model generating device 100 for a new domain may include a constitutor 110, a determiner 120, a trainer 130, a memory 140, and controller 150. In an alternative embodiment, the filled pause detection model generating device 100 may include one or more processors. In the alternative embodiment, the constitutor 110 to controller 150 may correspond to one or more processors. In the alternative embodiment, the constitutor 110 to controller 150 may correspond to software components configured to be executed by the one or more processors.

In the present embodiment, a Reptile algorithm among meta-learning algorithms may be used to generate a filled pause detection model of the new domain. The meta-learning algorithms are known as "learning to learning", and may be designed to allow the model to learn new skills or quickly adapt to new environments, through some training examples. Approaches to the meta-learning algorithms are to train an efficient distance metric, to use a neural network through external/internal memory, to optimize model parameters for fast training, and the like.

Among these, one of the ways to optimize model parameters for fast training is the Reptile algorithm. The Reptile algorithm may perform the following process repeatedly: sampling a task; training the model using stochastic gradient descent (SGD) on the sampled task about n times; and varying a model weight to obtain a new parameter. Typically, the existing model agnostic meta-learning (MAML) algorithm, the stochastic gradient descent (Meta-SGD) algorithm, and the like are computationally inefficient, and require calculation of a gradient. However, this issue may be solved by using the Reptile algorithm.

In the present embodiment, by using the Reptile algorithm among the meta-learning algorithms, an initial model parameter for a filled pause detection model of the new domain may be determined by combining model parameters for filled pause detection models of a plurality of existing domains, and the filled pause detection model of the new domain in which the initial model parameter is set may be trained using speech data from the new domain as training data. As a result, a filled pause detection model with high detection performance may be generated with only a small amount of training data included in the new domain. Here, the filled pause means a meaningless filler word which is used when a person is unable to smoothly continue speaking, and may include a non-linguistic element such as a meaningless syllable or word, such as "um", "uh", or the like.

The constitutor 110 may construct the filled pause detection model of the new domain. Here, configuring the filled pause detection model of the new domain may include loading the filled pause detection model of the new domain from the memory 140.

The determiner 120 may determine an initial model parameter for the filled pause detection model of the new domain by combining the model parameters for the filled pause detection models of the plurality of existing domains.

Here, the filled pause detection models of the plurality of existing domains may include a first filled paused detection model of a first domain to an Nth filled pause detection model of an Nth domain. The first filled pause detection model may be trained with speech data from the first domain, and the second filled pause detection model may be trained with speech data from the second domain. In this manner, the Nth filled pause detection model may be trained with speech data from the Nth domain. In addition, each of the speech data from the first domain to Nth domain may include first speech data that includes a filled pause generated in each domain, and second speech data that does not include a filled pause generated in each domain. The first speech data may be labeled as speech data that includes a filled pause, and the second speech data may be labeled as speech data that does not include a filled pause.

In the present embodiment, the domain may include recording environments or conversation topics from which the speech data is generated. For example, the recording environments may include an auditorium, a house, a restaurant, or the like, and the conversational topics may include a lecture, an everyday conversation, a call center, or the like. Here, speech data from the existing domains may be classified by domain and stored in the memory 140. In addition, speech data from the new domain may be classified into the new domain and stored in the memory 140. Here, the speech data from the new domain may be obtained from an external device and stored in the memory 140. For this purpose, the filled pause detection model generating device 100 may include a transceiver (not shown). The filled pause detection model generating device 100 may obtain, through the transceiver from the external device, the new domain and speech data included in the new domain.

In addition, the model parameters for the filled pause detection models of the plurality of existing domains may be stored in the memory 140. Accordingly, the determiner 120 may obtain, from the memory 140, the model parameters for the filled pause detection models of the plurality of existing domains, and combine the obtained the model parameters, to determine the initial model parameter for the filled pause detection model of the new domain.

The determiner 120 may combine model parameters for the filled pause detection models of the plurality of existing domains, to determine the initial model parameter for the filled pause detection model of the new domain. Generating the plurality of model parameters may be performed as follows.

The determiner 120 may sample any one of the plurality of existing domains stored in the memory 140. The determiner 120 may train the filled pause detection model using speech data included in the sampled domain as training data. The determiner 120 may first extract features of the training data, to train the filled pause detection model using the speech data included in the sampled existing domain as the training data. The determiner 120 may classify the training data into data including a filled pause and data not including a filled pause, by using, as input, the extracted features and training data labeled with whether or not a filled pause is included. A result of the classification may be outputted as an estimated value. The determiner 120 may calculate a loss function (L) representing a difference between the estimated value that is generated as the result of the classification and a targeted value, and optimize a weight such that the loss function (L) is minimized.

The determiner 120 may repeatedly perform sampling of the domain and training of the filled pause detection model of the domain a predetermined number of times (for example, k times). The determiner 120 may determine the initial model parameter for the filled pause detection model of the new domain, based on a plurality of (for example, k) model parameters obtained as the result of repeatedly performing the sampling of the domain and the training of the filled pause detection model of the domain the predetermined number of times. Here, the model parameter may include the weight and/or a bias value. In the present embodiment, the determiner 120 may determine an average calculation result of a plurality of (for example, k) model parameters as the initial model parameter for the filled pause detection model of the new domain.

The trainer 130 may train the filled pause detection model of the new domain in which the initial model parameter is set, using the speech data from the new domain as training data. Here, the speech data from the new domain may include first new speech data that includes a filled pause generated in the new domain, and second new speech data that does not include a filled pause. The first new speech data may be labeled as speech data that includes a filled pause, and the second speech data may be labeled as speech data that does not include a filled pause.

The initial model parameter is applied to the trainer 130, and the trainer 130 may first extract features of new training data, to train the filled pause detection model using the speech data included in the new domain as the new training data. The trainer 130 may extract the features of the new training data using a log-mel spectrogram algorithm. Here, the log-mel spectrogram algorithm is one method of extracting features of sound. The log-mel spectrogram algorithm may extract the features by dividing the training data into short times and analyzing the spectrogram for that short time, rather than for all of the training data. Detailed description thereof is as follows. First, a speech signal containing simulation noise in input time domain is divided into small frames (for example, 20-40 ms). Next, a power spectrogram (frequency) is calculated for each frame. Next, Mel filter banks are applied to the power spectrogram, and energies of each filter are summed. Next, a logarithm is taken of the energies of all filter banks.

The trainer 130 may classify the new training data into data including a filled pause and data not including a filled pause, by using, as input, the extracted features and the new training data labeled with whether or not a filled pause is included. A result of the classification may be outputted as an estimated value.

The trainer 130 may calculate a loss function (L) representing a difference between the estimated value that is generated as the result of the classification and a targeted value, and optimize a weight such that the loss function (L) is minimized. Here, the trainer 130 may optimize the weight using a stochastic gradient descent algorithm. The stochastic gradient descent algorithm may refer to updating the weight of only a portion of data, rather than updating the weight using all of the data. Here, the portion of data may be referred to as a mini-batch. The stochastic gradient descent algorithm has a computational cost of O(1) for the size of all of the data, and also has an implicit normalization effect.

Therefore, the stochastic gradient descent algorithm has an advantage of being suitable for a non-convex loss function (non-convex), that is, a loss function having the local minima.

The trainer 130 may store, in the memory 140, the filled pause detection model of the new domain generated as a result of training.

The memory 140 may store various kinds of information necessary for operations of the filled pause detection model generating device 100. In the present embodiment, the memory 140 may store a plurality of existing domains and speech data included in each of the plurality of existing domains. In addition, the memory 140 may store a new domain obtained from an external device, speech data included in the new domain, and a filled pause detection model for each of the domains.

In addition, the memory 140 may store instructions to be executed by the filled pause detection model generating device 100, for example, instructions to construct the filled pause detection model of the new domain, instructions to determine the initial model parameter for the filled pause detection model of the new domain by combining model parameters for the filled pause detection models of the plurality of existing domains, and instructions to train the filled pause detection model of the new domain in which the initial model parameter is set, using speech data from the new domain as training data, and the like.

Here, the memory 140 may include magnetic storage media or flash storage media, but the scope of the present disclosure is not limited thereto. The memory 140 may include an internal memory and/or an external memory and may include a volatile memory such as a DRAM, a SRAM or a SDRAM, and a non-volatile memory such as one-time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The controller 150, which is a type of a central processor, may drive control software provided in the memory 140 to control an overall operation of the filled pause detection model generating device 100.

Here, the controller 150 may include all types of devices capable of processing data, such as a processor. Here, "processor" may, for example, refer to a data processing device embedded in hardware, which has a physically structured circuitry to execute functions represented by codes or instructions included in a program. As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

In the present embodiment, the controller 150 may execute an artificial intelligence (AI) algorithm and/or machine learning algorithm in a 5G communication environment, so that the filled pause detection model generating device 100 may train an optimal filled pause detection model.

Here, artificial intelligence (AI) is an area of computer engineering science and information technology that studies methods to make computers mimic intelligent human actions such as reasoning, learning, self-improving, and the like.

In addition, the artificial intelligence does not exist on its own, but is rather directly or indirectly related to a number of other fields in computer science. Particularly in recent years, there have been numerous attempts to introduce an element of AI into various fields of information technology to solve problems of the respective fields.

Machine learning is an area of AI that includes the field of study that gives computers the capability to learn without being explicitly programmed. Specifically, machine learning may be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

In the present embodiment, the controller 150 may perform machine learning, such as deep learning, on speech data included in the domain. In addition, the memory 140 may store data used for machine learning, result data, and the like.

Deep learning technology, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN). For example, the deep learning structure may include a deep neural network (DNN), such as a convolutional neural network (CNN), a recurrent neural network (RNN), and a deep belief network (DBN). The deep learning structure according to the present embodiment may use various structures well known in the art. For example, the deep learning structure according to the present disclosure may include a CNN, a RNN, and a DBN. An RNN is widely used in natural language processing and may configure an ANN structure by building up layers at each instant in a structure that is effective for processing time-series data which vary with time. The DBN may include a deep learning structure that is constructed by stacking the result of restricted Boltzman machine (RBM) learning in multiple layers. The DBN has the number of layers formed by repeating RBM training. A CNN may include a model mimicking a human brain function, built under the assumption that when a person recognizes an object, the brain extracts the most basic features of the object and recognizes the object based on the results of complex processing in the brain.

Meanwhile, the artificial neural network may be trained by adjusting weights of connections between nodes (if necessary, adjusting bias values as well) so as to produce a desired output from a given input. Furthermore, the artificial neural network may continuously update the weight values through training. Furthermore, a method of back propagation, for example, may be used in the learning of the artificial neural network.

Meanwhile, the controller 150 may be provided with an artificial neural network, and may perform machine learning-based sentence generation using at least one of obtained spoken utterance or image information as input data.

The controller 150 may include an artificial neural network, for example, a deep neural network (DNN), and train the DNN, and examples of the DNN include a CNN, an RNN, a DBN, and the like. As a machine learning method for such an artificial neural network, both unsupervised learning and supervised learning may be used. The controller 150 may control so as to update an artificial neural network structure after learning according to a setting.

The filled pause detection model generating device 100 for the new domain may operate as follows in embodiments other than the above-described embodiments. The determiner 120 may determine a first model parameter by training a first filled pause detection model using speech data from the first domain as training data, and determine a second model parameter by training a second filled pause detection model using speech data from the second domain as training data. Here, the first domain and the second domain may be minimum units for the plurality of existing domains.

The determiner 120 may determine an initial parameter for a third filled pause detection model of the new domain based on the first model parameter and the second model parameter. Here, the determiner 120 may calculate an average value of the first model parameter and the second model parameter and determine the calculated average value as the initial parameter for the third filled pause detection model of the new domain.

The trainer 130 may train the third filled pause detection model to which the initial parameter is applied, using speech data from the new domain as training data. The third filled pause detection model of the new domain generated by the training may be stored in the memory 140.

The filled pause detection model generating device 100 for the new domain may operate as follows in embodiments other than the above-described embodiments. The constitutor 110 may construct the filled pause detection model of the new domain.

The determiner 120 may determine an initial parameter of the filled pause detection model, based on the first model parameter of the first filled pause detection model trained with the speech data from the first domain and the second model parameter of the second filled pause detection model trained with the speech data from the second domain. Here, the first domain and the second domain may be minimum units for the plurality of existing domains. The determiner 120 may calculate an average value of the first model parameter and the second model parameter and determine the calculated average value as the initial parameter for the filled pause detection model.

The trainer 130 may train the third filled pause detection model to which the initial parameter is applied, using the speech data from the new domain as the training data. The filled pause detection model of the new domain generated by the training may be stored in the memory 140.

Figure 2:
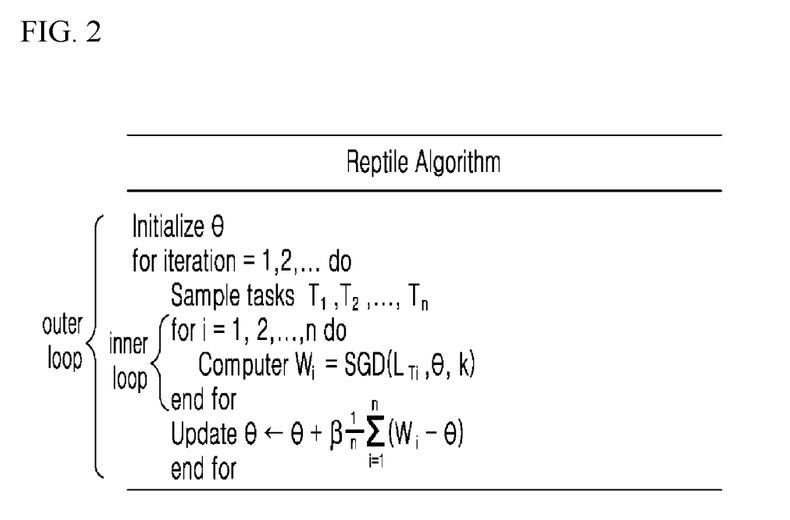
FIG. 2 is a diagram illustrating a Reptile algorithm for determining an initial model parameter for the filled pause detection model generating device for the new domain of FIG. 1.

FIG. 2 is a diagram illustrating a Reptile algorithm for determining an initial model parameter for the filled pause detection model generating device for the new domain of FIG. 1. Referring to FIG. 2, $\theta$ may represent a model parameter of a filled pause detection model, T is a task, which in the present embodiment may represent a domain including speech data, i is an index of the task, which in the present embodiment may represent an index of the domain including speech data, W may represent a weight generated as a result of training, L may represent a loss function, and k may represent a number of repetitions.

The filled pause detection model generating device 100 may first execute an outer loop on each of a plurality of existing domains. The filled pause detection model generating device 100 may perform sampling of any one of the plurality of existing domains and training of the filled pause detection model by the number of repetitions (for example, k=5), and calculate an average value of the obtained model parameters. Thereafter, the filled pause detection model generating device 100 may determine the calculated average value as the initial model parameter for the filled pause detection model of the new domain.

The filled pause detection model generating device 100 may apply the determined initial model parameter to the filled pause detection model of the new domain and output an optimized weight by executing an inner loop, that is, the filled pause detection model training, using speech data from the new domain as training data. The filled pause detection model generating device 100 may generate the filled pause detection model that outputs the optimized weight, as the filled pause detection model of the new domain.

Figure 3:
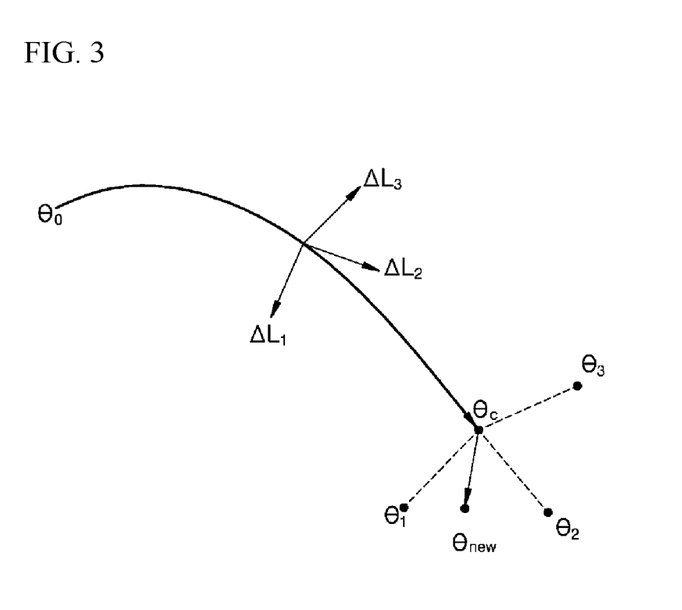
FIG. 3 is a diagram illustrating an operation of determining the initial model parameter for the filled pause detection model generating device for the new domain, using the Reptile algorithm of FIG. 2.

FIG. 3 is a diagram illustrating an operation of determining the initial model parameter for the filled pause detection model generating device for the new domain, using the Reptile algorithm of FIG. 2. Referring to FIG. 3, the initial model parameter $\theta_0$ may be located at any point of parameter space. The filled pause detection model generating device 100 may train the filled pause detection model for each domain, using speech data included in the existing domains (for example, $T_1$, $T_2$, and $T_3$) as training data. In this case, the initial model parameter $\theta_0$ may be optimized from any point to the $\theta_1$ position, $\theta_2$ position, and $\theta_3$ position, respectively.

In the present embodiment, the filled pause detection model generating device 100 may calculate a median value (average value, $\theta_c$) of model parameters $\theta_1$, $\theta_2$, and $\theta_3$ obtained from the existing domains. The calculated median $\theta_c$ of the model parameters may be determined as the initial model parameter of the filled pause detection model for the new domain (for example, $T_{new}$), and may be used for training. In this case, fast optimization may be achieved from the median value (average value, $\theta_c$) to the model parameter $\theta_{new}$ of the new domain.

If the median value (average value, $\theta_c$) is not calculated, when training the filled pause detection model in the new domain, optimization from the initial model parameter $\theta_0$ to the new model parameter $\theta_{new}$ may be required. Therefore, it may take a certain period of time to optimize the filled pause detection model of the new domain. However, in the present embodiment, the median value (average value, $\theta_c$) of the model parameters $\theta_1$, $\theta_2$, and $\theta_3$ for the existing domains may be determined as the initial model parameter of the filled pause detection model for the new domain (for example, $T_{new}$). Thereafter, the filled pause detection model is trained using speech data from the new domain as training data. As a result, the optimization from the median value (average value, $\theta_c$) to the model parameter $\theta_{new}$ of the new domain may be performed faster than in the case where the median value (average value, $\theta_c$) is not calculated and optimization from the initial parameter $\theta_0$ to the model parameter $\theta_{new}$ of the new domain is performed.

Figure 4:
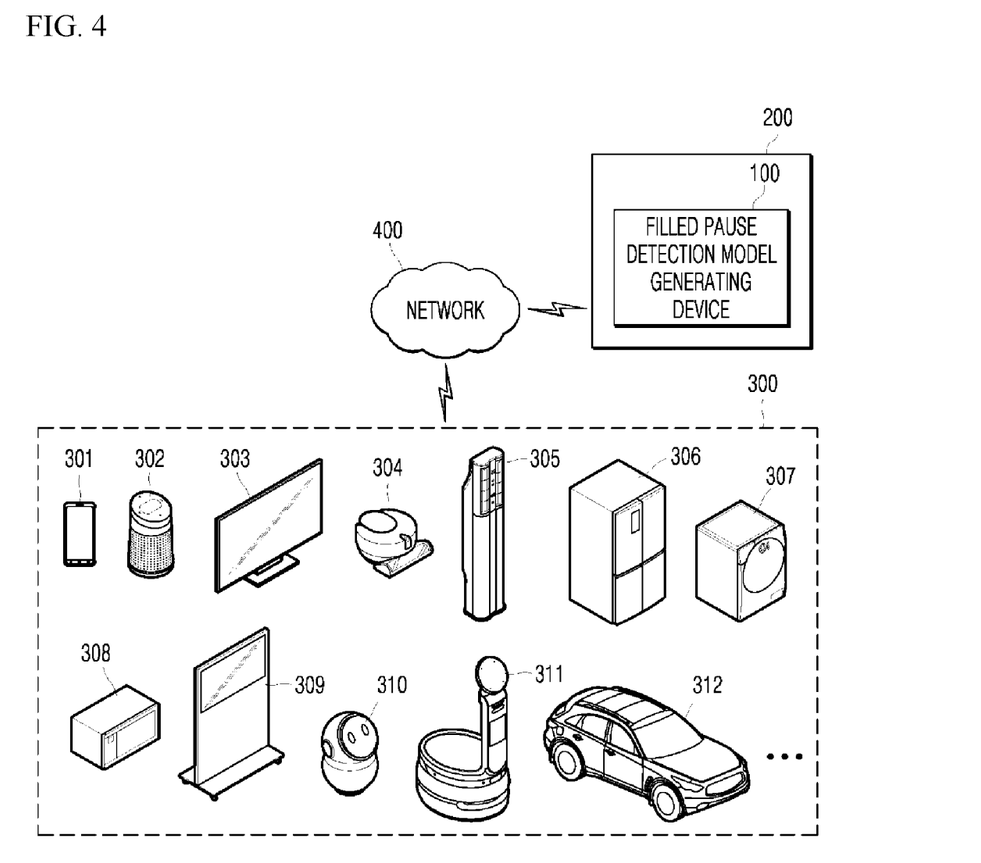
FIG. 4 illustrates a filled pause detection environment including a filled pause detection model generating device, a filled pause detector, an electronic device, and a network that connects them to each other, according to an embodiment of the present disclosure.
Figure 5:
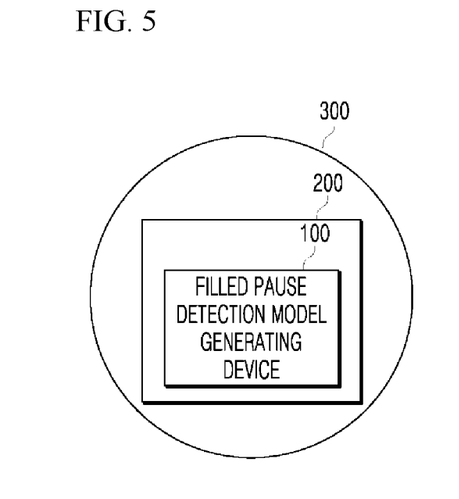
FIG. 5 is a diagram schematically illustrating an implementation of the filled pause detection model generating device according to an embodiment of the present disclosure.

FIG. 4 illustrates a filled pause detection environment including a filled pause detection model generating device, a filled pause detector, an electronic device, and a network that connects them to each other, according to the present embodiment. FIG. 5 is a diagram schematically illustrating an implementation of the filled pause detection model generating device according to the present embodiment. Hereinafter, description overlapping with that of FIGS. 1 to 4 will be omitted. Referring to FIG. 4, the filled pause detection environment may include a filled pause detector 200 including a filled pause detection model generating device 100, an electronic device 300, and a network 400.

The filled pause detection model generating device 100 may determine an initial model parameter for a filled pause detection model of a new domain by combining model parameters for filled pause detection models of a plurality of existing domains. Then, the filled pause detection model generating device 100 may train the filled pause detection model of the new domain in which the initial model parameter is set, using speech data from the new domain as training data. As a result, the filled pause detection model of the new domain may be generated.

The filled pause detector 200 may detect whether or not a filled pause is included in inputted speech data, by using the filled pause detection model generated by the filled pause detection model generating device 100.

In the present embodiment, the filled pause detection model generating device 100 may be independently provided as shown in FIG. 1, and may be provided in the filled pause detector 200 as shown in FIG. 4. The filled pause detector 200 may be independently provided as shown in FIG. 4, and may be provided in the electronic device 300 so that the electronic device 300 may operate as the filled pause detector 200, as shown in FIG. 5. That is, the electronic device 300 may obtain speech data, and may use the filled pause detection model provided therein to detect whether or not a filled pause is included in the speech data. The electronic device 300 may have a speech recognition function, which makes it possible to obtain and output speech, perform a speech recognition process on the obtained speech, and feed back the result.

The electronic device 300 may include various devices corresponding to the Internet of Things (IoT), such as a user terminal 301; an artificial intelligence speaker 302 that serves as a hub for connecting other electronic devices to a network 400; home appliances such as a TV 303, a robot cleaner 304, an air conditioner 305, a refrigerator 306, a washing machine 307, and a microwave oven 308; a signage 309 as a display device installed in a public place or a commercial place; a first communication robot 310 that may be provided in a home and communicate with a user through emotional interactions such as gaze, emotion expression, physical contact, or the like; a second communication robot 311 that may perform roles such as patrol, guidance, cleaning, disinfection, transportation, or the like in a public place (for example, an airport, a hospital, a company, or the like); an automobile 312; and the like. However, examples of the electronic device 300 are not limited to those depicted in FIG. 4.

Among the electronic devices 300, the user terminal 301 may be a desktop computer, a smartphone, a notebook, a tablet PC, a smart TV, a cell phone, a personal digital assistant (PDA), a laptop, a media player, a micro server, a global positioning system (GPS) device, an electronic book terminal, a digital broadcast terminal, a navigation device, a kiosk, an MP4 player, a digital camera, a home appliance, and other mobile or immobile computing devices operated by the user, but is not limited thereto. Furthermore, the user terminal 301 may be a wearable terminal having a communication function and a data processing function, such as a watch, glasses, a hair band, a ring, or the like. The user terminal 301 is not limited thereto, and thus any terminal that is capable of performing web browsing may be used without limitation.

The network 400 may serve to connect the electronic device 300 to the filled pause detection model generating device 100 and the filled pause detector 200. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 400 may transmit/receive information using short-range communications and/or long distance communications. Here, the short-range communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 400 may include connection of network elements such as hubs, bridges, routers, and switches. The network 400 may include one or more connected networks, including a public network such as the Internet and a private network such as a secure corporate private network. For example, the network may include a multi-network environment. Access to the network 400 can be provided via one or more wired or wireless access networks. Furthermore, the network 400 may support 5G communication and/or an Internet of things (IoT) network for exchanging and processing information between distributed components such as objects.

Figure 6:
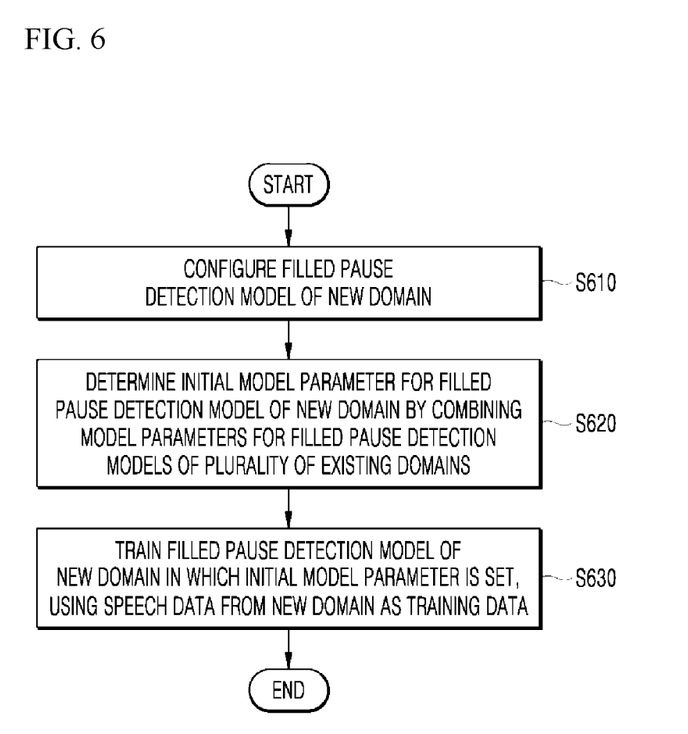
FIG. 6 is a flowchart illustrating a filled pause detection model generating method for a new domain according to an embodiment of the present disclosure.

FIG. 6 is a flowchart illustrating a filled pause detection model generating method for a new domain according to the present embodiment. Hereinafter, description overlapping with that of FIGS. 1 to 5 will be omitted.

Referring to FIG. 6, in step S610, a filled pause detection model generating device 100 constructs a filled pause detection model of a new domain. Here, constructing the filled pause detection model of the new domain may include loading the filled pause detection model of the new domain from a memory.

In step S620, the filled pause detection model generating device 100 may determine an initial model parameter for the filled pause detection model of the new domain by combining model parameters for filled pause detection models of a plurality of existing domains.

Here, the filled pause detection models of the plurality of existing domains may include a first paused detection model of a first domain to an Nth filled pause detection model of an Nth domain. The first filled pause detection model may be trained with speech data from the first domain, and the second filled pause detection model may be trained with speech data from the second domain. In this way, the Nth filled pause detection model may be trained with speech data from the Nth domain. In addition, each of the speech data from the first domain to Nth domain may include first speech data that includes a filled pause generated in each domain, and second speech data that does not include a filled pause generated in each domain. The first speech data is labeled as speech data that includes a filled pause, and the second speech data is labeled as speech data that does not include a filled pause.

The filled pause detection model generating device 100 may combine model parameters for the filled pause detection models of the plurality of existing domains, to determine the initial model parameter for the filled pause detection model of the new domain. Generating the plurality of model parameters may be performed as follows. The filled pause detection model generating device 100 may sample any one of the plurality of existing domains stored in the memory. The filled pause detection model generating device 100 may train the filled pause detection model using speech data included in the sampled domain as training data. The filled pause detection model generating device 100 may repeatedly perform sampling of the domain and training of the filled pause detection model of the domain a predetermined number of times (for example, k times). The filled pause detection model generating device 100 may determine the initial model parameter for the filled pause detection model of the new domain, based on a plurality of (for example, k) model parameters obtained as a result of repeatedly performing the sampling of the domain and the training of the filled pause detection model of the domain the predetermined number of times. Here, the model parameter may include a weight and/or a bias value. In the present embodiment, the filled pause detection model generating device 100 may determine an average calculation result of the plurality of (for example, k) model parameters as the initial model parameter for the filled pause detection model of the new domain.

In step S630, the filled pause detection model generating device 100 trains the filled pause detection model of the new domain in which the initial model parameter is set, using speech data from the new domain as training data. Here, the speech data from the new domain may include first new speech data that includes a filled pause generated in the new domain, and second new speech data that does not include a filled pause. The first new speech data may be labeled as speech data that includes a filled pause, and the second speech data may be labeled as speech data that does not include a filled pause.

The initial model parameter is applied to the filled pause detection model generating device 100, and the filled pause detection model generating device 100 may first extract features of new training data, to train the filled pause detection model using speech data included in the new domain as new training data. The filled pause detection model generating device 100 may extract the features of the new training data using a log-mel spectrogram algorithm. The filled pause detection model generating device 100 may classify the new training data into data including filled pause and data not including filled pause, by using, as input, the extracted features and the new training data labeled with whether or not a filled pause is included. A result of the classification may be outputted as an estimated value. The filled pause detection model generating device 100 may calculate a loss function (L) representing a difference between the estimated value that is generated as the result of the classification and a targeted value, and optimize a weight such that the loss function (L) is minimized. Here, the filled pause detection model generating device 100 may optimize the weight using a stochastic gradient descent algorithm. The filled pause detection model generating device 100 may store, in the memory, the filled pause detection model of the new domain generated as a result of training.

The embodiments described above may be implemented through computer programs executable through various components on a computer, and such computer programs may be recorded in computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the present embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A filled pause detection model generating method for a new domain, comprising:
  constructing a filled pause detection model of the new domain for performing speech recognition processing when a filled pause is included in inputted speech data;
  determining initial model parameters for the filled pause detection model of the new domain, wherein the determining comprises determining an average calculation result of model parameters for filled pause detection models of a plurality of existing domains;
  training, using a Reptile algorithm among meta-learning algorithms, the filled pause detection model of the new domain in which the initial model parameters are set, using speech data from the new domain as training data.

2. The filled pause detection model generating method of claim 1, wherein the filled pause detection models of the plurality of existing domains comprise a first filled pause detection model of a first domain to an Nth filled pause detection model of an Nth domain,
  the first filled pause detection model is trained with speech data from the first domain and the Nth filled pause detection model is trained with speech data from the Nth domain,
  each of the speech data from the first domain to Nth domain comprises first speech data that comprises a filled pause generated in each domain, and second speech data that does not comprise a filled pause generated in each domain, and
  the first speech data is labeled as speech data that comprises a filled pause, and the second speech data is labeled as speech data that does not comprise a filled pause.

3. The filled pause detection model generating method of claim 1, wherein the determining further comprises:

sampling any one of the plurality of existing domains;
training the filled pause detection model of the new domain using speech data comprised in the sampled domain as training data;
repeating the sampling and the training a predetermined number of times; and
determining the initial model parameters based on the plurality of model parameters obtained as a result of repeating the sampling and the training the predetermined number of times.

4. The filled pause detection model generating method of claim 1, wherein the training the filled pause detection model of the new domain comprises:
extracting features of the training data;
classifying the training data into data comprising a filled pause and data not comprising a filled pause, using, as input, the extracted features of the training data;
calculating a loss function representing a difference between an estimated value that is generated as a result of the classification and a target value; and
optimizing a weight to minimize the loss function.

5. The filled pause detection model generating method of claim 4, wherein the extracting features of the training data comprises extracting the features by applying a log-mel spectrogram algorithm to the training data.

6. The filled pause detection model generating method of claim 4, wherein the optimizing comprises optimizing the weight using a stochastic gradient descent algorithm.

7. A non-transitory computer-readable recording medium storing a computer program for executing a filled pause detection model generating method for a new domain, wherein the filled pause detection model generating method comprises:
constructing a filled pause detection model of the new domain for performing speech recognition processing when a filled pause is included in inputted speech data;
determining initial model parameters for the filled pause detection model of the new domain, wherein the determining comprises determining an average calculation result of model parameters for filled pause detection models of a plurality of existing domains
and
training, using a Reptile algorithm among meta-learning algorithms, the filled pause detection model of the new domain in which the initial model parameters are set, using speech data from the new domain as training data.

8. A filled pause detection model generating device for a new domain, comprising:
a processor configured to:
construct a filled pause detection model for the new domain;
determine initial model parameters for the filled pause detection model of the new domain, wherein the determining comprises determining an average calculation result of model parameters for filled pause detection models of a plurality of existing domains; and
train, using a Reptile algorithm among meta-learning algorithms, the filled pause detection model of the new domain in which the initial model parameters are set, using speech data from the new domain as training data.

9. The filled pause detection model generating device of claim 8, wherein the filled pause detection models of the plurality of existing domains comprise a first filled pause detection model of a first domain to an Nth filled pause detection model of an Nth domain,
the first filled pause detection model is trained with speech data from the first domain and the Nth filled pause detection model is trained with speech data from the Nth domain,
each of the speech data from the first domain to Nth domain comprises first speech data that comprises a filled pause generated in each domain, and second speech data that does not comprise a filled pause generated in each domain, and
the first speech data is labeled as speech data that comprises a filled pause, and the second speech data is labeled as speech data that does not comprise a filled pause.

10. The filled pause detection model generating device of claim 8, wherein the processor is further configured to:
sample any one of the plurality of existing domains;
train the filled pause detection model of the new domain using speech data comprised in the sampled domain as training data;
repeat the sampling of the new domain and the training of the new domain a predetermined number of times; and
determine the initial model parameters based on the plurality of model parameters obtained as a result of repeating the sampling of the new domain and the training of the new domain the predetermined number of times.

11. The filled pause detection model generating device of claim 8, wherein the processor is further configured to:
extract features of the training data when training the filled pause detection model of the new domain;
classify the training data into data comprising a filled pause and data not comprising a filled pause, using the extracted features of the training data as input;
calculate a loss function representing a difference between an estimated value that is generated as a result of the classification and a target value; and
optimize a weight to minimize the loss function.

12. The filled pause detection model generating device of claim 11, wherein the processor is further configured to extract the features by applying a log-mel spectrogram algorithm to the training data.

13. The filled pause detection model generating device of claim 11, wherein the processor is further configured to optimize the weight using a stochastic gradient descent algorithm.

* * * * *